US012669358B2

(12) United States Patent
Schultheis et al.

(10) Patent No.: US 12,669,358 B2
(45) Date of Patent: Jun. 30, 2026

(54) THERMAL FLOWMETER AND METHOD FOR OPERATING A THERMAL FLOWMETER

(71) Applicant: Endress+Hauser Flowtec AG, Reinach (CH)

(72) Inventors: Hanno Schultheis, Lörrach (DE); Alexander Grün, Lörrach (DE); Sascha Kamber, Tenniken (CH)

(73) Assignee: Endress+Hauser Flowtec AG, Reinach (CH)

( * ) Notice: Subject to any disclaimer, the term of this patent is extended or adjusted under 35 U.S.C. 154(b) by 310 days.

(21) Appl. No.: 18/568,461

(22) PCT Filed: May 18, 2022

(86) PCT No.: PCT/EP2022/063477
§ 371 (c)(1),
(2) Date: Dec. 8, 2023

(87) PCT Pub. No.: WO2022/263089
PCT Pub. Date: Dec. 22, 2022

(65) Prior Publication Data
US 2024/0271975 A1      Aug. 15, 2024

(30) Foreign Application Priority Data

Jun. 16, 2021      (DE) ..................... 10 2021 115 553.3

(51) Int. Cl.
*G01F 1/684*            (2006.01)
*G01F 1/69*             (2006.01)
(52) U.S. Cl.
CPC .............. *G01F 1/6842* (2013.01); *G01F 1/69* (2013.01)

(58) Field of Classification Search
CPC ................................. G01F 1/6842; G01F 1/69
See application file for complete search history.

(56) References Cited

U.S. PATENT DOCUMENTS 6,227,045 B1 * 5/2001 Morse ....................... G01F 1/68
73/204.25
7,644,612 B2 1/2010 Schrag et al.
(Continued)

FOREIGN PATENT DOCUMENTS

CN        101311686 A1      11/2008
CN        101405580 A1      4/2009
(Continued)

*Primary Examiner* — Helen C Kwok
(74) *Attorney, Agent, or Firm* — Christopher R. Powers; Endress+Hauser (USA) Holding, Inc.

(57) ABSTRACT

A thermal flowmeter includes: a measuring tube, having a measuring tube cross-section and a measuring tube axis; a sensor having a main sensor body and four probes designed to heat a medium, determine a temperature thereof, or influence the flow of the medium in the measuring tube; and an electronic measuring/operating circuit, wherein the probe bodies span a rhombus on a surface of the main sensor body, wherein a first diagonal of the rhombus is parallel to the measuring tube axis, and a second diagonal lies in the measuring tube cross-section, wherein a first probe and a second probe are designed to heat the medium, and at least a third probe is designed to determine the temperature of the medium, and wherein the first probe and the second probe are arranged on the first diagonal, and the at least one third probe is arranged on the second diagonal.

12 Claims, 5 Drawing Sheets

(56)                    References Cited

U.S. PATENT DOCUMENTS

| 11,280,650 B2 * | 3/2022 | Grün | G01F 1/684 |
| 11,761,806 B2 * | 9/2023 | Grün | G01F 1/684 |
| | | | 73/204.11 |
| 2011/0048564 A1 * | 3/2011 | Wible | G01F 1/6842 |
| | | | 138/37 |
| 2011/0098944 A1 * | 4/2011 | Pfau | G01F 1/6842 |
| | | | 73/204.25 |
| 2015/0192445 A1 * | 7/2015 | Olin | G01F 15/024 |
| | | | 702/45 |
| 2016/0187174 A1 * | 6/2016 | Kharsa | F17D 5/005 |
| | | | 73/204.25 |
| 2017/0045393 A1 * | 2/2017 | Kurz | G01F 1/74 |
| 2018/0313679 A1 * | 11/2018 | Schultheis | G01F 1/684 |
| 2021/0055145 A1 * | 2/2021 | Grün | G01F 1/684 |

FOREIGN PATENT DOCUMENTS

| CN | 108139252 A1 | 6/2018 | |
| CN | 111801552 A1 | 10/2020 | |
| DE | 102007023840 A1 | 11/2008 | |
| DE | 102014114940 A1 * | 4/2016 | G01P 5/10 |
| DE | 102015118123 A1 | 4/2017 | |
| DE | 102018105046 A1 | 9/2019 | |
| WO | WO-2019170397 A1 * | 9/2019 | G01F 1/69 |
| WO | 2020216583 A1 | 10/2020 | |
| WO | 2020244856 A1 | 12/2020 | |

* cited by examiner

THERMAL FLOWMETER AND METHOD FOR OPERATING A THERMAL FLOWMETER

CROSS-REFERENCE TO RELATED APPLICATIONS

The present application is related to and claims the priority benefit of German Patent Application No. 10 2021 115 553.3, filed Jun. 16, 2021, and International Patent Application No. PCT/EP2022/063477, filed May 18, 2022, the entire contents of which are incorporated herein by reference.

TECHNICAL FIELD

This invention relates to a thermal flowmeter and a method for operating a thermal flowmeter.

BACKGROUND

Thermal flow measurement is based upon drawing conclusions about the mass flow of the medium from the energy input via a probe into a medium flowing past the probe or from the temperature of a heated probe located in the medium. However, the direction in which the medium flows cannot be derived from the energy input or from the temperature of the probe.

Document DE102015118123A1 shows a sensor of a thermal flowmeter which is immersed in a measuring tube of the flowmeter and has several probes which are designed either to heat the medium and measure their own temperature or to measure the temperature of the medium. Furthermore, a flow resistor is designed to produce a direction-dependent incident flow of a heatable probe in order to be able to derive an unambiguous indication of the direction of the flow of the medium in the measuring tube from the directional dependence of the incident flow. However, it has been shown that at low to medium flow rates, a flow direction indication is associated with high uncertainties.

DE102018105046A1 and WO2020244856A1 show further sensors of thermal flowmeters with flow direction detection, in which high uncertainties in the flow direction indication are still present at a low flow rate.

SUMMARY

The object of the invention is therefore to propose a flowmeter by means of which reliable detection of the direction of flow of the medium in the measuring tube is made possible.

The object is achieved by a thermal flowmeter and by a method according to the present disclosure.

A flowmeter according to the invention for measuring the mass flow of a medium in a measuring tube comprises:

a measuring tube with a measuring tube wall and a measuring tube axis;

a sensor having four probes which project from a main sensor body into the measuring tube, wherein the probes are designed to heat the medium, determine the temperature thereof, or influence the flow of the medium in the measuring tube;

an electronic measuring/operating circuit which is designed to operate at least three probes and to generate and provide flow measurement values by means of the operation thereof, wherein each probe has a main probe body and an active probe body, wherein the main probe body is in each case arranged on a side of the corresponding probe facing the main sensor body, and wherein the active probe body is in each case arranged on a side, facing away from the main sensor body, of the corresponding probe, wherein the active probe body is designed to heat the medium, determine the temperature of the medium, and/or influence the flow of the medium in the measuring tube, wherein the main probe bodies are columnar, wherein the main probe bodies span a rhombus on a surface of the main sensor body, wherein the rhombus is defined by surface centroids of cross-sections of the main probe bodies, wherein a first diagonal of the rhombus is parallel to the measuring tube axis, and wherein a second diagonal lies in a measuring tube cross-section, wherein a first probe and a second probe are designed to heat the medium, wherein at least a third probe is designed to determine a temperature of the medium, wherein the first probe and the second probe are arranged on the first diagonal, and wherein the at least one third probe is arranged on the second diagonal.

In this way, power coefficients determined by means of the electronic measuring/operating circuit between a probe designed as a heating element and a third probe can be used advantageously for direction detection, since, in both flow directions, one probe designed as a heating element is directly exposed to the incident flow, and another probe designed as a heating element is arranged in the shadow area of the flow. The fact that the probes designed as heating elements both lie on the first diagonal parallel to the measuring tube axis results in the first probe and the second probe having the same measurement behavior.

In one embodiment, the electronic measuring/operating circuit is designed to use, from a group comprising the first probe and the second probe, a first group member and a third probe to form a pair of probes for measuring the mass flow, and to use the other group member to determine the flow direction, wherein the electronic measuring/operating circuit is designed, when a change in flow direction is detected, to exchange the group members in order to measure the mass flow and to determine the flow direction.

In one embodiment, the first probe, the second probe, and the at least one third probe each comprise a probe sleeve, wherein the flowmeter has resistance thermometers, wherein at least one resistance thermometer is arranged in interiors, surrounded by the probe sleeves, of each of the first, second, and third probes, which resistance thermometer is designed to detect a temperature or to emit thermal energy.

In one embodiment, an internal angle $\beta$ of the rhombus belonging to the first probe is less than 90°, and in particular less than 75° and preferably less than 60°.

In one embodiment, an outer diameter of the probes in respective active regions is at least 1 mm and in particular 1.5 mm and preferably at least 2 mm, and/or at most 7 mm and in particular at most 5 mm and preferably at most 4 mm.

In one embodiment, a centroid of a cross-section of the main probe body of the first probe is at a first distance from a centroid of a cross-section of the main probe body of the second probe, wherein the first distance is at least two outer diameters.

In one embodiment, cross-sections of the probes have a circular outline at least in regions of the active probe bodies.

In a method according to the invention for operating a flowmeter according to the invention, in a first method step, from a group comprising the first probe and the second probe, a first group member with a third probe form a pair of probes for measuring the mass flow, wherein the other group member in each case is used to determine the flow direction, characterized in that, when a change in flow direction is detected in a second method step for measuring the mass flow and for determining the flow direction, the group members are exchanged.

In one embodiment, the electronic measuring/operating circuit determines a first power coefficient using the first probe and at least one third probe, and determines a second power coefficient using the second probe and at least one third probe, wherein the electronic measuring/operating circuit infers a change in flow direction from a progression over time of a difference in the power coefficients—in particular, from a change in sign of the difference.

BRIEF DESCRIPTION OF THE DRAWINGS

The invention will now be described with reference to schematic exemplary embodiments shown in the figures, which include.

DETAILED DESCRIPTION

Figure 1:
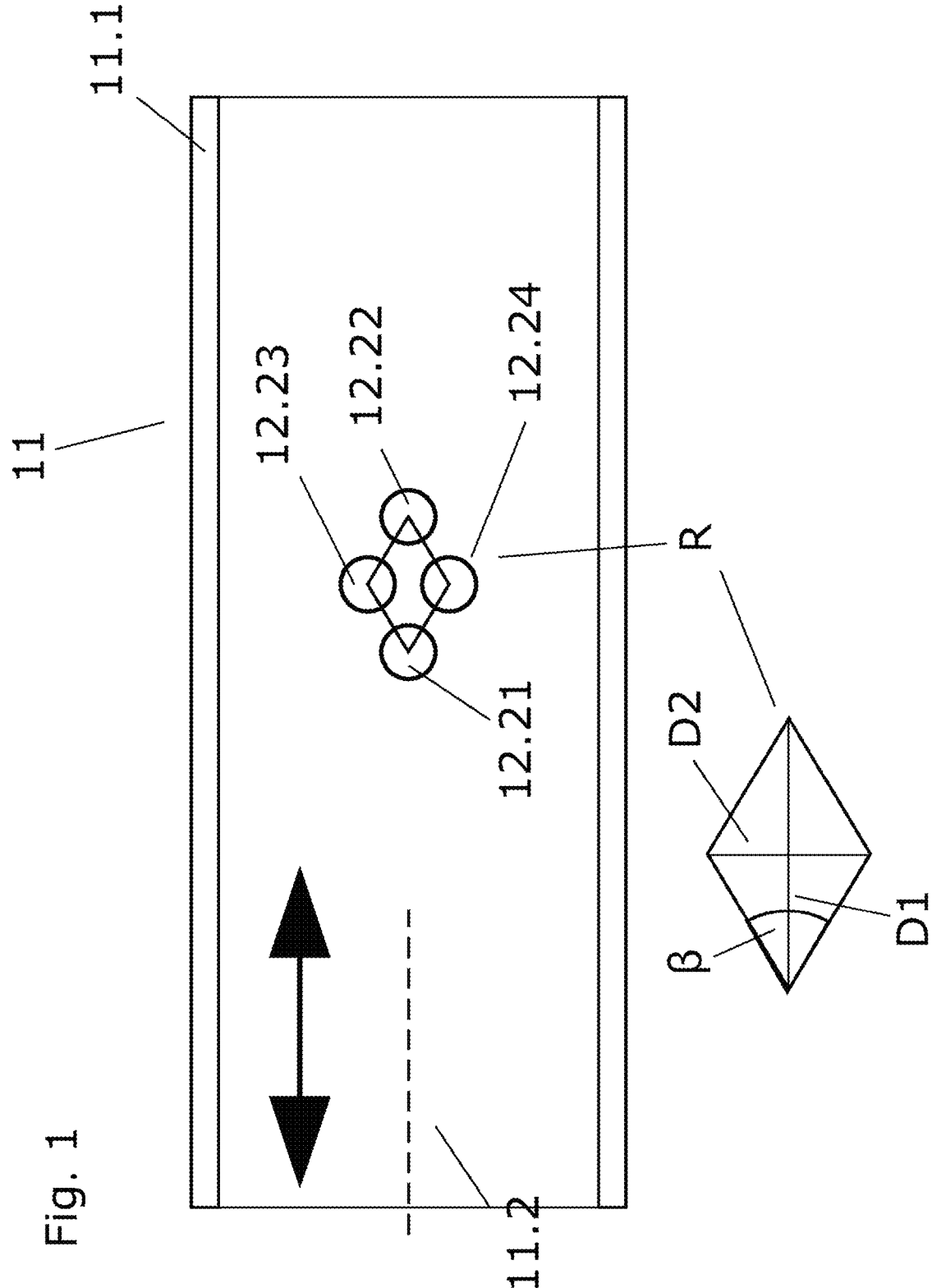
FIG. 1 shows active regions of an exemplary probe arrangement according to the present disclosure of a thermal flowmeter.

FIG. 1 shows active regions of a probe arrangement according to the invention in a measuring tube 11 with a measuring tube wall 11.1 with in each case a first probe 12.21, a second probe 12.22, a third probe 12.23, and a fourth probe 12.24. The active regions are the regions in which active probe bodies W (see FIGS. 2 and 3) take effect. The active probe bodies each connect to a main probe body G of the corresponding probe, which main probe bodies are connected to a main sensor body 12.1. The effect of the active probe bodies is to heat the medium, determine the temperature of the medium, and/or influence the flow of the medium in the measuring tube. The first probe 12.21 and a second probe 12.22 are designed to heat the medium, and at least a third probe 12.23 is designed to determine the temperature of the medium. The fourth probe can be solid in this case. Alternatively, instead of the fourth probe, a further third probe can be provided.

The main probe bodies of a probe arrangement span a rhombus, wherein a first diagonal D1 of the diagonal is oriented in parallel to a measuring tube axis 11.2. FIG. 1 illustrates the orientation of the measuring tube axis. A second diagonal D2 lies in a cross-section of the measuring tube.

As a result, a high degree of symmetry or independence of the flow resistor of the sensor from the flow direction of the medium is achieved. An internal angle β associated with the first probe is in this case less than 90 degrees, such that the probe arrangement has a low flow resistance.

According to the invention, the first probe and the second probe are arranged on the first diagonal, and wherein the at least one third probe is arranged on the second diagonal.

In this way, power coefficients determined by means of the electronic measuring/operating circuit (see FIG. 4) between a probe designed as a heating element and a third probe can be used advantageously for direction detection, since, in both flow directions, one probe designed as a heating element is directly exposed to the incident flow, and another probe designed as a heating element is arranged in the shadow area of the flow. Because the probes, which are designed as heating elements, both lie on the first diagonal parallel to the measuring tube axis, the symmetry of the rhombus arrangement results in the first probe having the same measurement behavior, when the flow comes from a first direction, as the second probe when the flow comes from a second direction opposite to the first direction. This arrangement thus proves to be particularly advantageous with regard to measurement accuracy, even given a low flow rate and measurement stability with regard to flow direction detection.

For example, an electronic measuring/operating circuit 13 (see FIG. 4) determines a first power coefficient using the first probe and at least one third probe, and determines a second power coefficient using the second probe and at least one third probe, wherein the electronic measuring/operating circuit infers a change in flow direction from a progression over time of a difference in the power coefficients—in particular, from a change in sign of the difference.

Figure 2:
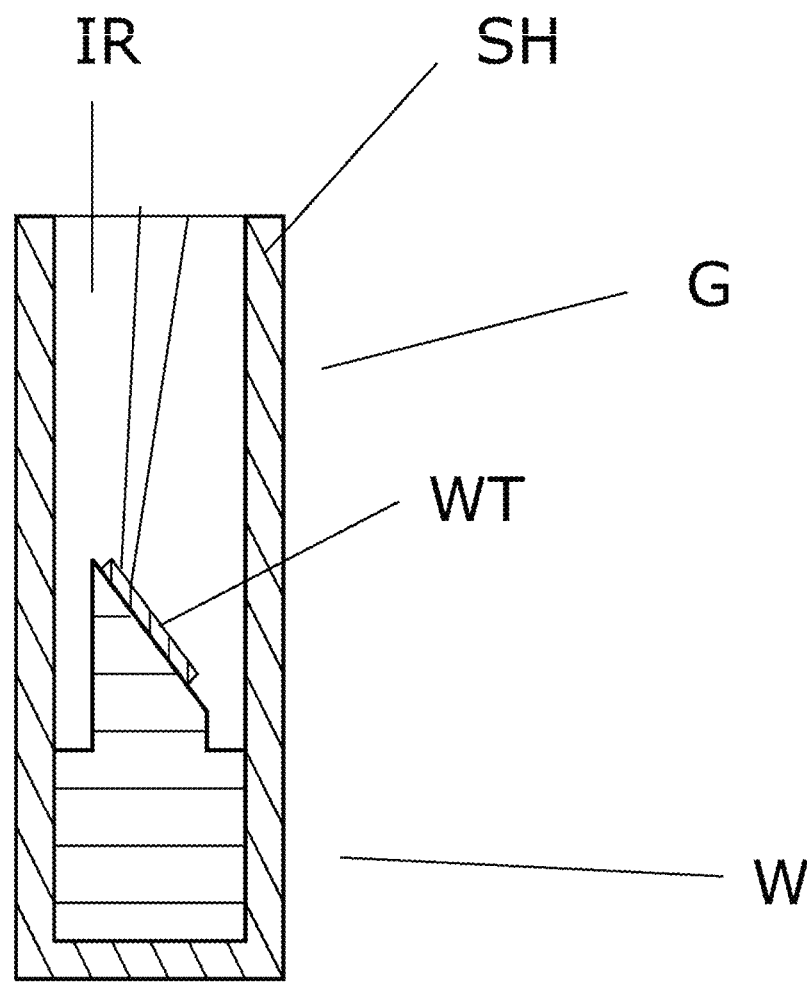
FIG. 2 shows a longitudinal cross-section through an exemplary first, second, or third probe.

FIG. 2 shows a longitudinal section through an exemplary first, second, or third probe, wherein a probe sleeve SH defines an interior IR of the probe, in which interior the probe has a resistance thermometer WT. The resistance thermometer is thereby thermally and mechanically coupled to the probe sleeve via a contact means. The contact means can, for example, be a molten material melted during production of the probe and subsequently machined after solidification. However, a contacting process such as explosive cladding from the probe sleeve to the contact means and subsequent machining can also be applied, for example. The examples mentioned here are not to be interpreted as limiting.

Figure 3:
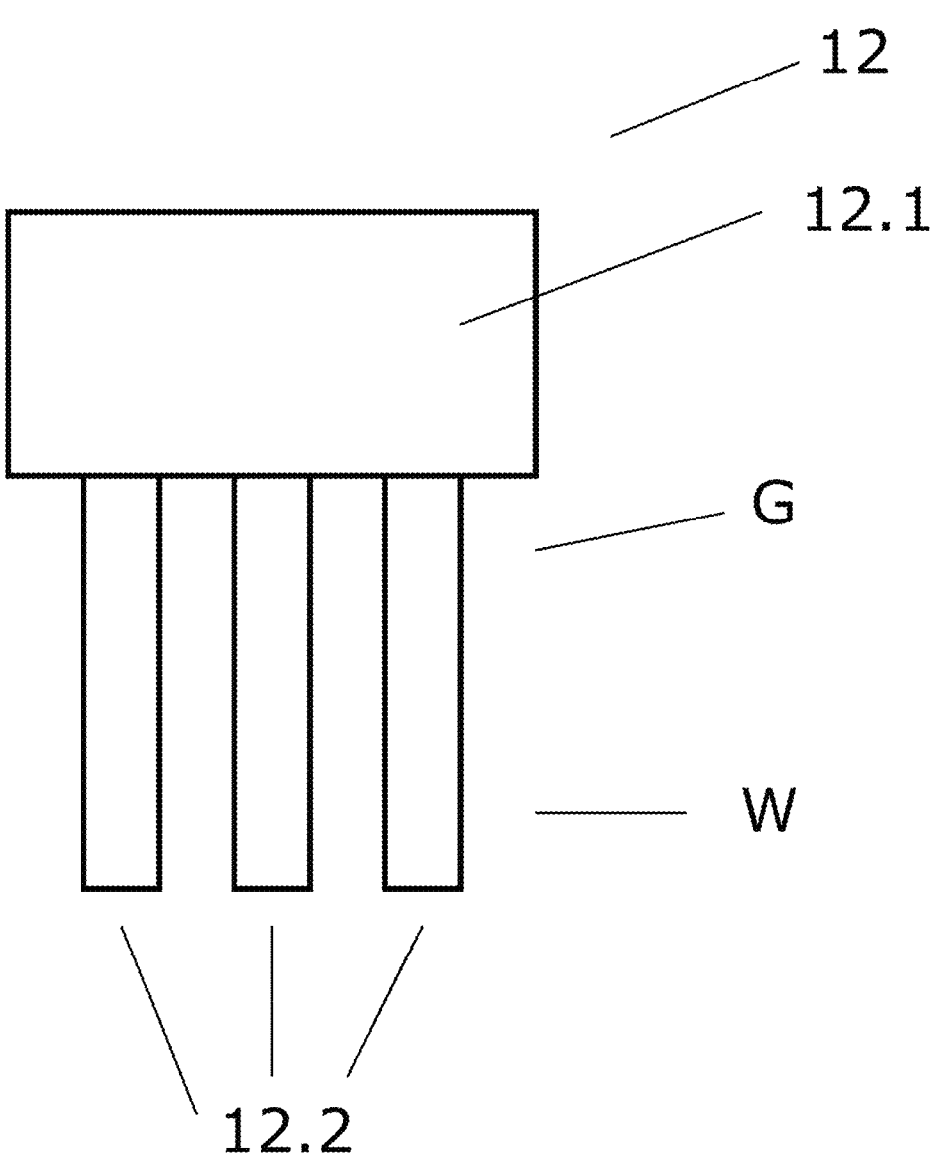
FIG. 3 shows a side view of a sensor according to the present disclosure.

FIG. 3 shows a schematic side view of a sensor 12 of a thermal flowmeter, which sensor has a main sensor body 12.1 and probes 12.2, wherein the probes, as described with respect to FIG. 2, each comprise a main probe body G and an active probe body W.

Figure 4:
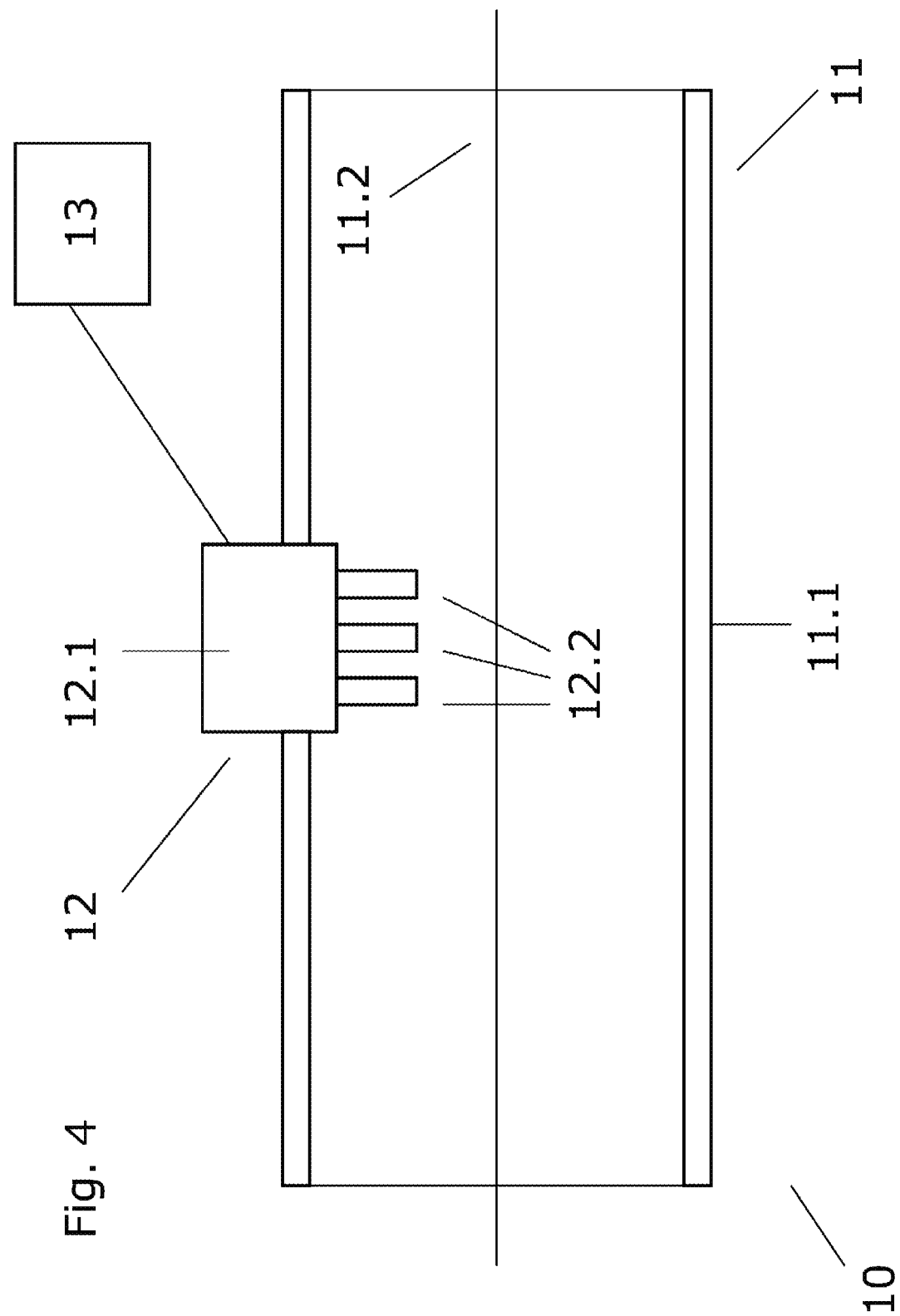
FIG. 4 illustrates a schematic structure of an exemplary schematic thermal flowmeter according to the present disclosure.

FIG. 4 illustrates a schematic structure of a thermal flowmeter 10 according to the invention having a measuring tube 11 with a measuring tube wall 11.1 and a measuring tube axis 11.2, a sensor 12 with a main sensor body 12.1 and with probes 12.2, and an electronic measuring/operating circuit 13 for operating the sensor and providing flow measurement values. The main sensor body is attached in a medium-tight manner in the measuring tube wall. The active regions of the probes are preferably arranged in a flow region of the medium in which a local mass flow deviates by less than 10%, and in particular by less than 5% and preferably by less than 2%, from a mean value formed over a flow cross-section.

Figure 5:
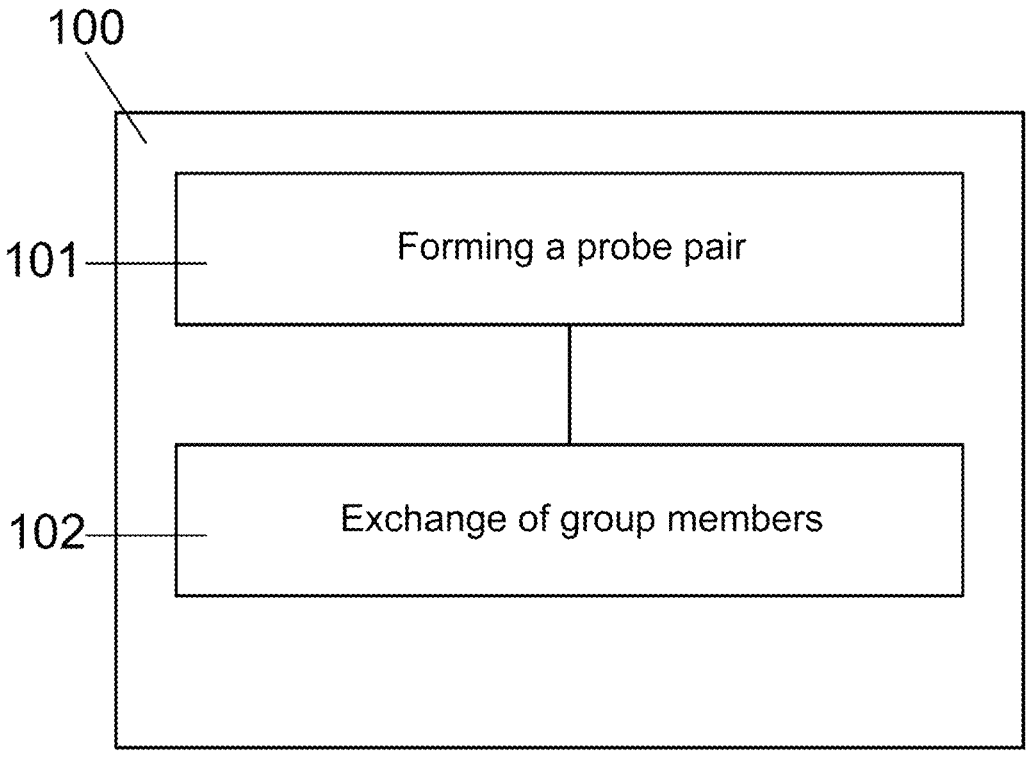
FIG. 5 illustrates a sequence of a method according to the present disclosure.

FIG. 5 illustrates the sequence of an exemplary method 100 according to the invention.

In a first method step 101, from a group comprising the first probe 12.21 and the second probe 12.22, a group member with a third probe 12.23 form a pair of probes for measuring the mass flow, wherein the other group member in each case is used to determine the flow direction, wherein, when a change in flow direction is detected in a second method step 102 for measuring the mass flow and for determining the flow direction, the group members are exchanged.

In one embodiment, the electronic measuring/operating circuit determines a first power coefficient using the first probe and at least one third probe, and determines a second power coefficient using the second probe and at least one third probe, wherein the electronic measuring/operating circuit infers a change in flow direction from a progression over time of a difference in the power coefficients—in particular, from a change in sign of the difference. In this way, a high degree of independence of a measurement characteristic of the sensor 12 (e.g., FIG. 1) from a flow direction of the medium in the measuring tube can be achieved.

The invention claimed is:

1. A thermal flowmeter for measuring a mass flow of a flowable medium in a measuring tube, the flowmeter comprising:
the measuring tube defined by a measuring tube wall and having a measuring tube axis;
a sensor including four probes, which project from a main sensor body into the measuring tube, wherein the probes are configured to heat the medium, determine a temperature of the medium, or influence a flow of the medium in the measuring tube; and
an electronic measuring/operating circuit configured to operate at least three of the four probes and to generate and provide flow measurement values by operation of the at least three probes,
wherein each probe includes a main probe body and an active probe body, wherein the main probe body comprises a proximal side adjacent the main sensor body, and wherein the active probe body comprises a distal side facing away from the main sensor body,
wherein each active probe body is operable to heat the medium, determine the temperature of the medium, and/or influence the flow of the medium in the measuring tube,
wherein each main probe body is columnar,
wherein the four main probe bodies define a rhombus on a surface of the main sensor body, wherein the rhombus is defined by surface centroids of cross-sections of the four main probe bodies,
wherein a first diagonal of the rhombus is parallel to the measuring tube axis, and wherein a second diagonal lies in a measuring tube cross-section,
wherein a first probe and a second probe of the four probes are configured to heat the medium,
wherein a third probe of the four probes is configured to determine the temperature of the medium, and
wherein the first probe and the second probe configured to heat the medium define a group of probes and are arranged on the first diagonal parallel to the measuring tube axis, and wherein the third probe is arranged on the second diagonal such that, for both a first flow direction along the measuring tube axis and a second flow direction opposite to the first flow direction, a first member of the group is directly exposed to the flowing medium, and a second member of the group is arranged in a shadow area of the flowing medium, and
wherein the electronic measuring/operating circuit is configured to:

determine a first power coefficient using the first probe and the third probe;
determine a second power coefficient using the second probe and the third probe;
identify the first member of the group, based on the first power coefficient and the second power coefficient, and thereby determine whether the flowing medium is flowing in the first flow direction or the second flow direction;
use the identified first member and the third probe to define a pair of probes adapted to measure the mass flow; and
when a change from the first flow direction to the second flow direction, or vice versa, is detected, exchange the identifications of first member and the second member with each other.

2. The flowmeter according to claim 1,
wherein the first probe, the second probe, and the third probe each comprise a probe sleeve,
wherein the flowmeter includes resistance thermometers, wherein at least one resistance thermometer is arranged in an interior of each of the first probe, the second probe, and the third probe, the respective interior surrounded by the corresponding probe sleeve, which resistance thermometer is configured to detect a temperature or to emit thermal energy.

3. The flowmeter according to claim 1, wherein a fourth probe of the four probes is solid.

4. The flowmeter according to claim 1, wherein an internal angle of the rhombus adjacent the first probe is less than 90°.

5. The flowmeter according to claim 4, wherein the internal angle is less than 60°.

6. The flowmeter according to claim 1, wherein an outer diameter of each of the four probes in respective active regions is at least 1 mm and/or at most 7 mm.

7. The flowmeter according to claim 6, wherein each respective outer diameter in the respective active regions is at least 2 mm and/or at most 4 mm.

8. The flowmeter according to claim 1,
wherein the respective cross-sections of the main probe bodies of the first probe and the second probe each have an outer diameter,
wherein the centroid of the cross-section of the main probe body of the first probe is at a distance from the centroid of the cross-section of the main probe body of the second probe, and
wherein the distance is equal to at least two outer diameters.

9. The flowmeter according to claim 1, wherein cross-sections of each of the four probes have a circular perimeter, at least in regions of the active probe bodies.

10. A method for operating the flowmeter according to claim 1, the method comprising:
determining the first power coefficient using the first probe and the third probe;
determining the second power coefficient using the second probe and the third probe;
identifying the first member of the group of probes based on the first power coefficient and the second power coefficient, and thereby determining whether the flowing medium is flowing in the first flow direction or the second flow direction;
using the identified first member and the third probe for forming a pair of probes adapted to measure the mass flow; and exchanging the identifications of first member and the second member when a change from the first flow direction to the second flow direction or vice versa is detected.

11. The method according to claim 10, further comprising:

determining a first power coefficient using the first probe and the third probe;

determining a second power coefficient using the second probe and the third probe, each determining using the electronic measuring/operating circuit; and inferring the change in the flow direction from a progression over time of a difference in the first and second power coefficients using the electronic measuring/operating circuit.

12. The method according to claim 11, wherein the progression includes a change in sign of the difference.

* * * * *